(12) United States Patent
Retat et al.

(10) Patent No.: US 7,192,229 B2
(45) Date of Patent: Mar. 20, 2007

(54) APPARATUS FOR RELEASABLY SECURING A LOAD TO A STRUCTURE

(75) Inventors: Ingo Retat, Achim (DE); Guenter Boerchers, Lilienthal (DE); Volker Groth, Bremen (DE); Wolfgang Tritsch, Bremen (DE)

(73) Assignee: EADS Space Transportation GmbH, Bremen (DE)

( * ) Notice: Subject to any disclaimer, the term of this patent is extended or adjusted under 35 U.S.C. 154(b) by 144 days.

(21) Appl. No.: 11/099,219

(22) Filed: Apr. 4, 2005

(65) Prior Publication Data

US 2005/0232745 A1    Oct. 20, 2005

(30) Foreign Application Priority Data

Apr. 3, 2004    (DE) .................. 10 2004 016 593

(51) Int. Cl.
*B60P 1/64*    (2006.01)
(52) U.S. Cl. ...................................... 410/77
(58) Field of Classification Search .............. 410/77, 410/2, 31, 44, 46, 52, 78, 80, 90, 91; 244/173.1, 244/173.3
See application file for complete search history.

(56) References Cited

U.S. PATENT DOCUMENTS

| | | | |
|---|---|---|---|
| 3,815,849 A * | 6/1974 | Meston ..................... | 244/173.1 |
| 4,082,240 A * | 4/1978 | Heathman et al. ........ | 244/173.1 |
| 4,303,214 A | 12/1981 | Wittmann et al. | |
| 4,711,417 A * | 12/1987 | Steffy ...................... | 244/173.3 |
| 6,148,740 A | 11/2000 | Jackel et al. | |
| 6,845,949 B2 * | 1/2005 | Blackwell-Thompson et al. ...................... | 244/173.1 |

FOREIGN PATENT DOCUMENTS

| DE | 198 50 699 | 7/2000 |
|---|---|---|
| EP | 0 256 001 | 11/1989 |

* cited by examiner

*Primary Examiner*—H Gutman
(74) *Attorney, Agent, or Firm*—W. F. Fasse; W. G. Fasse

(57) ABSTRACT

A load, such as a pallet, is releasably secured to a fixed structure, e.g. a cargo bay of a space shuttle. The pallet (5) is secured to a support (2), which holds the pallet and is secured in the cargo bay. A first interlocking device (ID1) is provided at each end of the support. A second interlocking device (ID2) is provided at each end of the pallet. The first interlocking device (ID1) includes a shaft (1) rotatably held in a shaft mounting bracket (3A) secured to a respective support end (3). The second interlocking device (ID2) includes a bracket (4) secured to an end of the pallet (5), a claw (4A) secured to the bracket, a groove in the claw (4A) and a fork (6) in the groove of the claw (4A). A central shaft section (1A) is received in the fork (6) for the interlocking. The shaft (1) is movable in the fork (6) in the direction of the x-axis and of the z-axis. The shaft is also rotatable about the x-axis and tiltable relative to the y-axis. The fork is turnable about the z-axis. These motions are possible in the locked state due to the construction of the interlocking devices (ID1 and ID2). In the unlocked state, jamming and even seizing are avoided or minimized by increasing play.

20 Claims, 3 Drawing Sheets

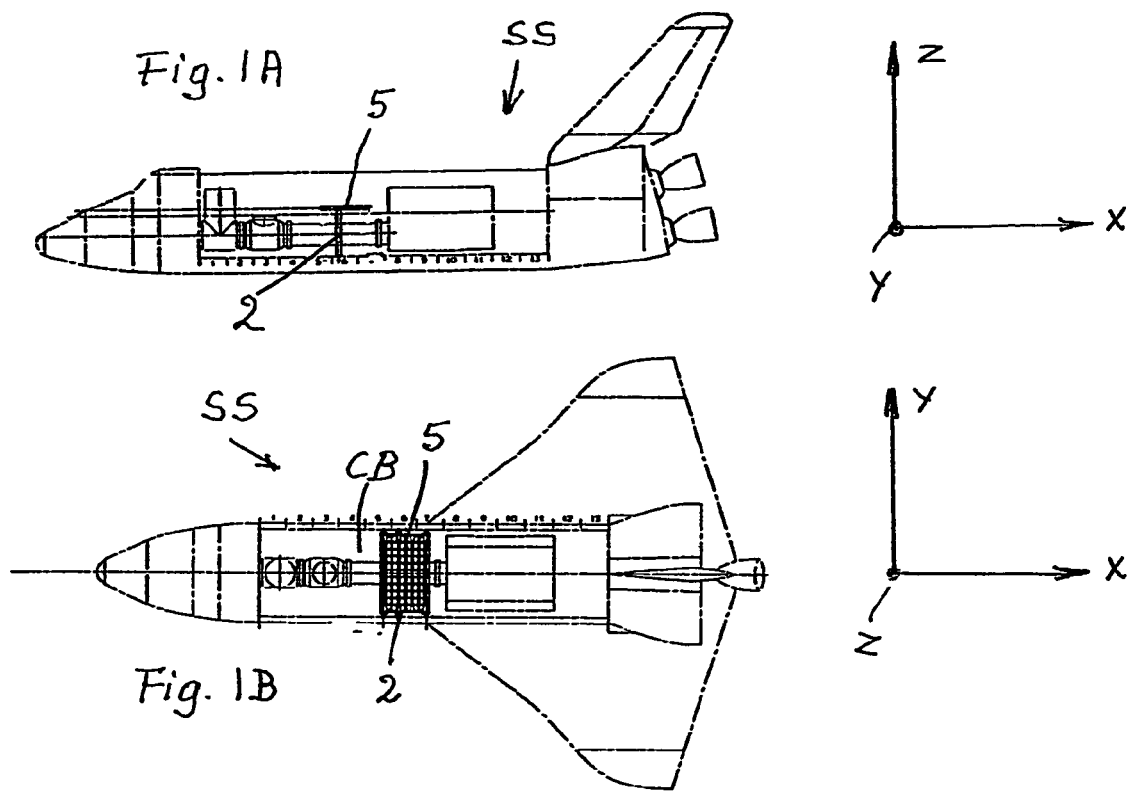
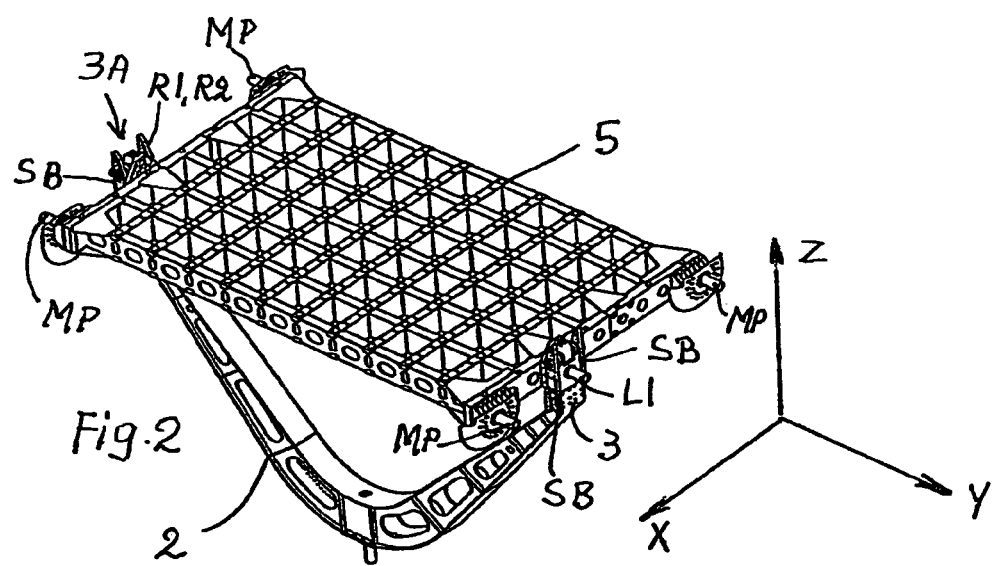

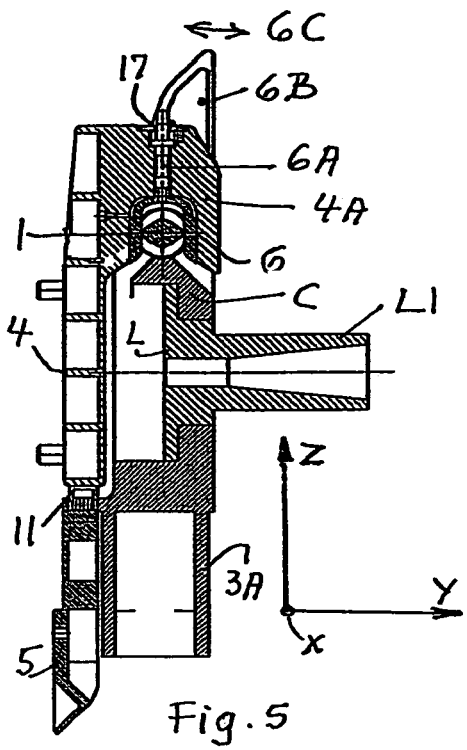
Fig. 5
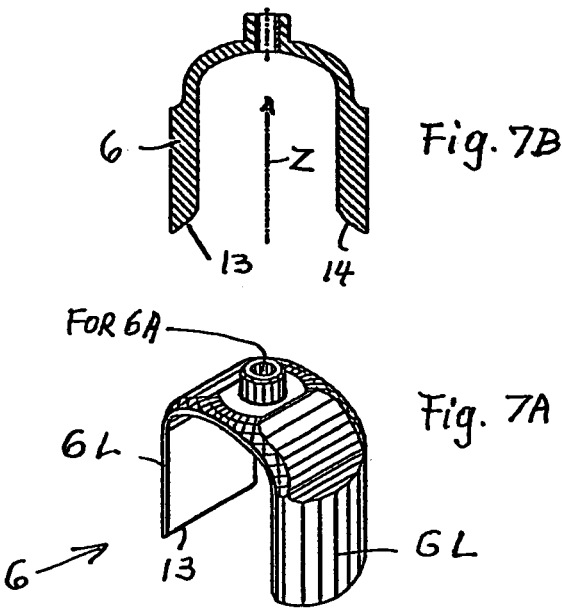
Fig. 7B
Fig. 7A
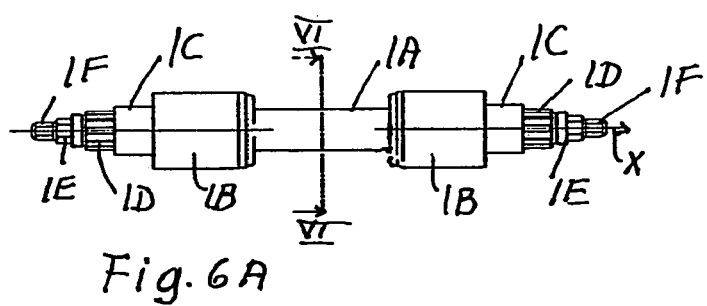
Fig. 6A
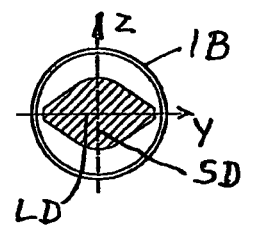
Fig. 6B
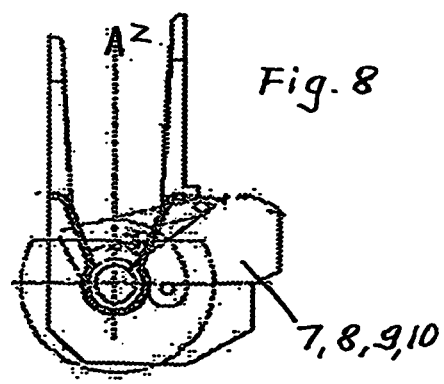
Fig. 8

APPARATUS FOR RELEASABLY SECURING A LOAD TO A STRUCTURE

PRIORITY CLAIM

This application is based on and claims the priority under 35 U.S.C. §119 of German Patent Application 10 2004 016 593.9, filed on Apr. 3, 2004, the entire disclosure of which is incorporated herein by reference.

FIELD OF THE INVENTION

A load such as a pallet is releasably secured to a fixed structure such as the loading bay of a space shuttle transport vehicle for transferring cargos from earth to a space station.

BACKGROUND INFORMATION

It is known to secure a payload pallet in the loading bay of a space shuttle which forms a fixed structure in which the pallet is secured by releasable clamps in the directions of the x- and z-axis of a three dimensional coordinate system defined by the fixed structure of the space shuttle. The forces in the y-direction are transferred from the pallet into the fixed structure through a yoke shaped holding structure known as a keel yoke assembly (KYA).

Orbital space stations such as the International Space Station (ISS) which moves on an orbit relatively close to earth, must be supplied with all sorts of supplies. In the case of the ISS the supplies are secured primarily on a pallet mounted in the cargo bay of the space shuttle which transports the supplies with the pallet to the orbital station. Conventionally, the pallet and its support structure remain in the shuttle during the entire mission. The pallet is conventionally an unpressurized cargo pallet (UCP). The keel yoke assembly secures the pallet in the cargo bay and takes up forces in the direction of the y-axis, namely crosswise to the cargo bay of the shuttle. The keel yoke assembly rigidly secures the pallet to the shuttle and the pallet cannot be separated from the shuttle once in orbit. The supplies must be individually transferred from the pallet in the cargo bay to the space station. Such a mounting of the pallet in the space shuttle is, for example, described in German Patent Publication DE 198 50 699 C1.

Future missions still in the planning stage provide for the removal of the payload pallet from the shuttle while leaving the keel yoke assembly in the shuttle and docking the pallet to the outside of the space station to simplify transfer of supplies. In this connection it is known to secure removable payload items to the keel with the help of a keel pin or by a so called trunnion holding the loads in the x- and y-directions and with at least one port side pin and one starboard pin for holding the pallet in the x- and z-directions. In that case it is possible to release the payload solely by opening the standard holding clamps provided in the shuttle. With the clamps open the payload can be removed from the shuttle and fixed again in the shuttle by closing the clamps. Such mountings are known from European Patent Publication EP 0 256 001 B1 and from U.S. Pat. No. 4,303,214. This type of mounting can, however, not be realized when it is intended to secure payload items to the top surface of the pallet and to the underside of the pallet. For this purpose it would be necessary to temporarily remove the pallet from the shuttle in order to completely unload the load items from both sides of the pallet. In such a case the forces effective in the direction of the y-axis cannot be introduced, as is conventional, directly from the payload through struts into the keel of the shuttle.

OBJECTS OF THE INVENTION

In view of the foregoing it is the aim of the invention to achieve the following objects singly or in combination:

to construct the mounting of the payload pallet in a space shuttle in such a way that it becomes possible to remove the pallet with its payload during a mission from the shuttle and to return the pallet into the shuttle while simultaneously assuring that during starting and landing the pallet is reliably secured in the shuttle;

to avoid the need for securing payload items that are attached to the downwardly facing side of the pallet, to the fixed structure of the shuttle;

to make it possible that the pallet can be temporarily docked to a space station;

to construct the mounting assemblies or interlocking devices in such a way that these devices will remain fully functional within a temperature range of about −100° C. to +100° C.; and to assure that the empty pallet can again be securely mounted in the shuttle once the payload has been removed from the pallet and to do so without additional power or manual drives.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

According to the invention an apparatus which achieves the above objects is characterized in that the forces in the y-direction are taken up by at least two locking shafts each forming part of a respective first interlocking device. Each first interlocking device is mounted and operatively secured to an end of a support, such as a keel yoke assembly (KYA). Each locking shaft engages a respective fork forming part of one of at least two second interlocking devices secured to brackets which in turn are secured to the cargo carrying pallet. Each locking shaft is adjustable, prior to interlocking, to be movable in its respective fork in the directions of the x- and z-axis of the shuttle coordinate system x, y, z, in an axial or translatory manner while the shafts are also rotatable about the x-axis and tiltable about the y-axis within certain play limits. The forks in turn are turnably mounted to a respective bracket for adjustment about the z-direction within certain play limits. Once the interlocking is completed, the play is eliminated.

The above features according to the invention simultaneously solve the problem which is caused by the extreme temperature changes that can occur at a space station in orbit. More specifically, the present fork and shaft interlocking devices function in temperature ranges from about −100° C. to about +100° C. Thus, the present fork and shaft interlocking remains functional when the pallet is secured to the space station for unloading while exposed to temperature differences to about 100° K. Under such operating conditions the physical dimensions of the interlocking structural components namely the cargo pallet and support structure can vary up to 10 mm. The present mounting is capable to hold the pallet even under these temperature dependent variations in the dimensions of the fork and of the shaft without any additional power or manually operated drives thereby permitting the return and resecuring of the pallet in the cargo bay of the shuttle for a return flight.

BRIEF DESCRIPTION OF THE DRAWINGS

In order that the invention may be clearly understood, it will now be discussed, by way of example, with reference to the accompanying drawings wherein:

FIG. 1A shows a side view of a space shuttle wherein the x-axis of a three dimensional coordinate system is the longitudinal axis of the space shuttle, the y-axis extends perpendicularly to the plane of the drawing sheet and the z-axis extends vertically upwardly in the plane of the drawing sheet;

FIG. 1B is a plan view of the space shuttle showing an open cargo bay with the y-axis extending at right angles to the x-axis or length of the shuttle, and the z-axis extending perpendicularly to the plane of the drawing sheet;

FIG. 2 is a perspective view of a cargo pallet secured to a keel yoke assembly;

FIG. 5 is a sectional view in the y-z-plane showing a locking shaft of the first interlocking device in the interlocked shaft position in the locking fork of the second interlocking device;

FIG. 6A shows a side view of the locking shaft according to the invention;

FIG. 6B shows a sectional view along section line VI—VI in FIG. 6A with the section extending in the y-z-plane;

FIG. 7A shows a perspective view of the present locking fork;

FIG. 7B shows a sectional view of the locking fork of FIG. 7A; and

FIG. 8 is a sectional view through a conventional payload retention and latching assembly (PRLA) of a space shuttle.

DETAILED DESCRIPTION OF PREFERRED EXAMPLE EMBODIMENTS AND OF THE BEST MODE OF THE INVENTION

Figure 3:
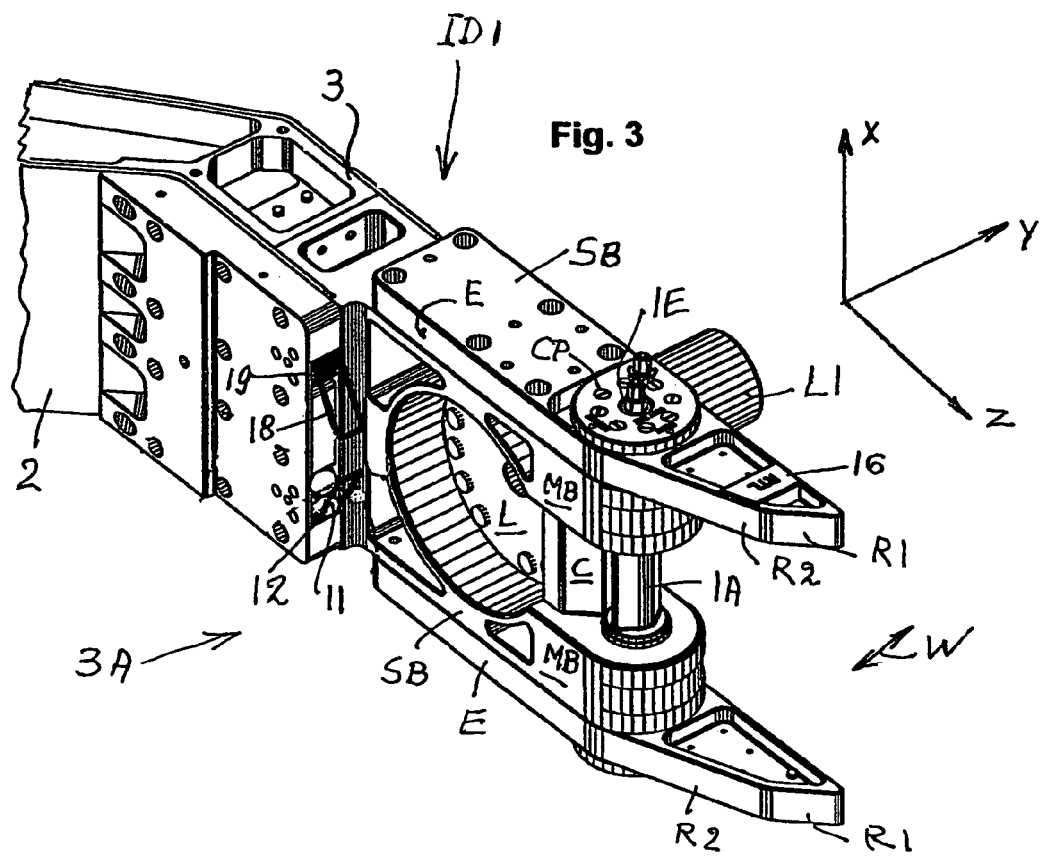
FIG. 3 is a perspective view of one end of the keel yoke assembly showing details of a first interlocking device secured to an end of the keel yoke assembly for engaging a second interlocking device secured to the cargo pallet as shown in FIG. 4.
Figure 4:
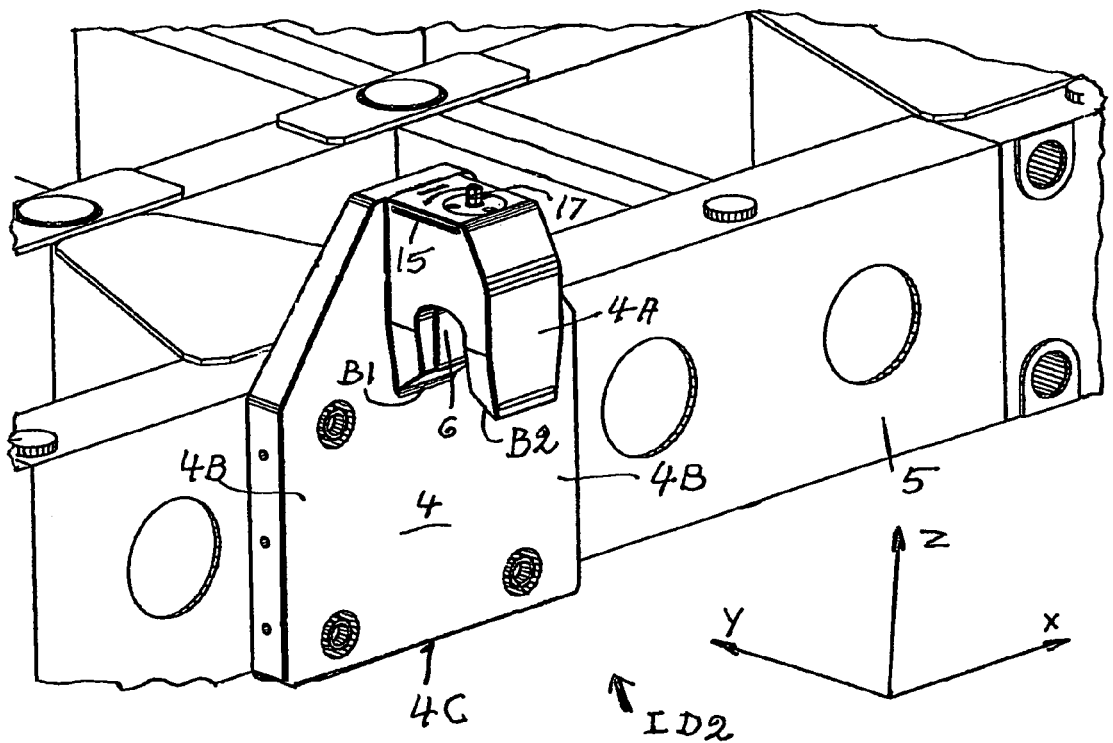
FIG. 4 is a perspective view of an end of the cargo pallet showing the second interlocking device secured to the cargo pallet.

The present securing system comprises a first interlocking device ID1 shown in FIG. 3 and a second interlocking device ID2 shown in FIG. 4. One first interlocking device ID1 is secured to each end of the keel yoke assembly referred to as support 2. The first interlocking device ID1 includes a locking shaft 1 shown in FIGS. 6A and 6B. A central shaft section 1A shown in FIG. 3 cooperates with a claw 4A and fork 6 forming part of the second interlocking device ID2. One second interlocking device ID2 is secured to each end of a pallet 5 which does not need to remain in the shuttle. Only the support 2 remains in the shuttle SS. According to the invention the pallet 5 is easily removed from the shuttle SS, docked to a space station, unloaded and then returned into the shuttle.

FIGS. 1A and 1B show the space shuttle SS in a side view and in a plan view, respectively. The pallet 5 is mounted to the support 2 in the cargo bay CB. The shuttle SS is considered to be an example of a fixed structure which defines a three dimensional coordinate system with x-, y-, and z-axes. The first and second interlocking devices ID1 and ID2 transmit forces only in the direction of the y-axis whereby certain axial and rotational degrees of freedom permitted by design between the interacting components prior to completing the interlocking, make sure that the mounting is substantially not sensitive to any jamming and even seizing.

To simplify the illustration, the perspective view of FIG. 2 shows the pallet 5 secured to the support 2 outside of the shuttle SS. Each end 3 of the support 2 is equipped with a shaft mounting bracket 3A shown in FIG. 3 having interconnected side boards SB with ramps R1, R2 to be described in more detail below. Opposite ends of the pallet 5 are equipped, preferably at the corners, with mounting pins MP for engagement by clamps 7, 8, 9 and 10 shown in present FIG. 8. These clamps 7, 8, 9 and 10 connect the load pallet 5 to the shuttle SS and must be distinguished from the present interlocking devices ID1 and ID2 that connect the pallet 5 to the support 2. Each interlocking device ID1 is equipped with a lock L shown in FIG. 3 including a locking element L1 seen in FIGS. 2 and 3 for holding a locking cam C and thus the locking shaft 1A in a locked position.

The clamps 7, 8, 9, 10 are conventional and known as "payload retention and latching assemblies" (PRLAS) which hold the pallet in the direction of the x-axis and in the direction of the z-axis. The two interlocking devices ID1 and ID2 according to the invention hold the pallet in the direction of the y-axis.

FIG. 3 shows perspectively one end 3 of the support 2. The shaft mounting bracket 3A is operatively secured to the support end 3. Two push out springs 11 and 18 are secured to an edge of the support end 3 for aiding the separation of the first and second interlocking devices ID1 and ID2 from each other when the pallet 5 is to be removed from the support 2 and out of the shuttle SS. The spring 11 is mounted on a core 12. The spring 18 is wound on a core 19. Should a spring break, the respective core 12, 19 will hold spring fragments in place.

FIG. 3 further shows the structure of the shaft mounting bracket 3A with its two interconnected side boards SB carrying mounting blocks MB for the locking shaft 1 shown in more detail in FIGS. 6A and 6B. Only the central shaft section 1A of the shaft 1 is visible in FIG. 3. The side boards SB have edges E each provided with the above mentioned ramps R1, R2. Preferably each ramp R1, R2 has a different sloping angle relative to its edge E. These ramps R1, R2 help guiding the first interlocking device ID1 into engagement with the second interlocking device ID2.

FIG. 3 shows an opening positioned between the two side boards SB. The above mentioned lock L including the externally accessible locking element L1 are operatively mounted in the opening for holding the cam C and thus the locking shaft 1 in a locked position when the first and second interlocking devices ID1, ID2 have been interlocked. The locking shaft 1 is mounted in the mounting blocks MB and can be rotated about the x-axis when at least one nut 1E is loosened. The locking shaft 1 is also movable axially in the direction of the x-axis when a cover plate CP is loosened at least at one of the mounting blocks MB. This axial adjustment of the locking shaft 1 permits centering the shaft section 1A between the mounting blocks MB for a proper engagement with a fork 6 to be described below with reference to FIG. 4.

An arrow W in FIG. 3 shows that the support 2 has an elastically deformable structure that can be widened in the direction of the y-axis as indicated by the arrow W. This widening happens when the ramps R1, R2 engage respective side surfaces 4B of brackets 4 of the pallet 5 and the pallet 5 is moved downwardly. At the same time bevels B1 and B2 of a claw 4A and bevels 13, 14 of a fork 6 lead the shaft 1 or rather its central section 1A into engagement with the fork 6 in a groove of a claw 4A of bracket 4.

Referring to FIG. 4, identical brackets 4 are mounted to opposite ends of the pallet 5 to be releasably secured by the support 2, such as a keel yoke assembly, for holding the pallet 5 in the space shuttle SS. The claw 4A is rigidly secured to the bracket 4 which is secured to the pallet 5. The above mentioned locking shaft 1 with its mounting bracket 3A forms the first interlocking device ID1. The bracket 4 with its claw 4A forms the second interlocking device ID2. The two interlocking devices ID1 and ID2 cooperate with each other for releasably mounting the pallet 5 in the cargo bay CB of the space shuttle SS as seen in FIG. 1B. Once the two interlocking devices ID1 and ID2 are interlocked, in this example embodiment, forces up to about 45,000N (Newton) can be transmitted into the fixed structure.

More specifically FIG. 4 shows the second interlocking device ID2 secured to an end of the pallet 5. An identical device ID2 is secured to the opposite end, not shown, of the pallet 5. Each second interlocking device ID2 comprises the bracket 4, the claw 4A secured to or forming part of the bracket 4, the fork 6 mounted in a groove of the claw 4A and held in place by a bolt 6A and a nut 17, best seen in FIG. 5. The nut 17 is threaded to the bolt 6A. An adjustment tool 6B rigidly securable to the bolt 6A permits turning the fork about the axis within a certain play limit. This feature permits wiggling the fork 6 back and forth as indicated by an arrow 6C in FIG. 5 to help free the locking shaft 1 out of the fork 6 to avoid or at least minimize jamming or even seizing.

FIG. 4 further shows side surfaces 4B along the sides of the bracket 4 to the right and left of the claw 4A. These side surfaces 4B are formed for engagement with the ramps R1, R2 of the shaft mounting bracket 3A to thereby help elastically deform the support 2 in the directions of the arrow W when the pallet 5 is inserted into the support 2 as shown in FIG. 2. The claw 4A has bevels B1, B2 leading into the groove in which the fork 6 is held. These bevels B1, B2 cooperate with similar bevels 13, 14 of the fork 6 as best seen in FIG. 7B, for guiding the central shaft section 1A of the locking shaft 1 into the fork 6 thereby completing the elastic deforming of the support 2.

The interlocking devices ID1 and ID2 according to the invention and the conventional clamps 7, 8, 9 and 10 are released when the pallet 5 is to be removed from the space shuttle SS and docked to a space station (not shown). The pallet 5 can be lifted out of the space shuttle SS and docked at the space station whereby the pallet 5 is first moved in the direction of the z-axis by equipment available in the shuttle or the space station. When the pallet 5 is moved in the direction of the z-axis the shaft section 1A of the first interlocking device ID1 slides out of the fork 6. This release is substantially facilitated by first adjusting the position of the shaft 1 so that its short diameter SD is aligned with the y-axis and the large diameter LD is aligned with the z-axis to establish the unlocked position. Thus, for all practical purposes no forces are necessary to release the shaft 1 from the fork 6. However, the above mentioned push out springs 11 and 18 are provided as described above on the bracket 3A. These springs 11 and 18 bear against an edge 4C of the bracket 4. Thus, any remaining friction forces between the shaft 1 and the fork 6 are compensated and no external forces are necessary to free the shuttle from the support 2 that remains in the space shuttle SS.

The features of the present interlocking devices ID1 and ID2 are such that the above described movement of the pallet 5 out of the space shuttle SS for unloading can be performed without any problems at temperatures within the range of about −100° C. to +100° C. Generally, the temperature difference between the pallet 5 and the interlocking devices ID1 and ID2 is small, for example less than 10 K (Kelvin). However, when the pallet 5 is to be reinserted into the cargo bay CB of the space shuttle SS, it is possible that large temperature differences prevail, for example, when the pallet 5 was docked on the shade side of the space station, while the space shuttle SS and the support 2 were exposed to the sun. In that case the temperature differences between the pallet 5 and the space shuttle SS may reach up to 100 K. At such a temperature difference the spacing between the mounting ends 3 of the support 2, more specifically, the on-center spacing between the locking shafts 1 at both ends of the support 2 in the direction of the y-axis may be about 10 mm larger than the length of the pallet 5 in the direction of the y-axis, more specifically the distance between the centers of the forks 6 at opposite ends of the pallet 5.

In order to nevertheless interconnect the second interlocking device ID2 on the pallet 5 with the first interlocking devices ID1 at the ends of the support 2, under these conditions, the support 2 can be elastically deformed as mentioned above in both directions of the y-axis as indicated by the double arrow W in FIG. 3. The forces required for this purpose are produced by the power driven clamps 7, 8, 9 and 10 of the space shuttle SS. When the clamps 7, 8, 9 and 10 are closed, the pallet is first pulled in the negative direction of the z-axis of the support 2 guided by the bevels 13 and 14 of the fork 6 and by the bevels B1 and B2 of the claw 4A, whereby the support 2 is widened in the direction of the y-axis.

For this widening or expansion the support 2 can elastically deform in the positive and negative direction of the y-axis, whereby one portion of the support 2 moves in the positive direction while the other portion of the support 2 moves in the negative direction. However, once the two interlocking devices ID1 and ID2 are interconnected, by the pallet 5, the combined structure is rather stiff in the direction of the y-axis and thus the pallet 5 is securely held in the space shuttle to take up all forces and vibrations during starting and landing. As an example, when the pallet 5 is inserted into the support 2 the stiffness is about 10,050 N/mm compared to a stiffness of the support 2 without the pallet 5 of only about 230 N/mm.

Once the pallet 5 has returned from its docked position at the space station, the power driven clamps 7, 8, 9 and 10 are closed only after it has been ascertained by means of sensor elements 15, 16 observed by space shuttle cameras that the pallet 5 is sufficiently inserted into the cargo bay CB of the space shuttle SS. If that is the case, the clamps 7, 8, 9 and 10 are closed on the mounting pins MP to pull the pallet 5 into the cargo bay and into the interlock with the support 2. Rather than using electrical sensors, according to the invention the sensor elements comprise optical sensors 15 such as cameras and optical sensor markers 16 in order to avoid electrical interfaces. Thus, optical cameras 15 are provided on the claw 4A and sensor markers 16 to be sensed by the cameras 15 on the shaft mounting bracket 3A to provide control signals for the power drives of the clamps 7, 8, 9 and 10. When these cameras 15 and markers 16 are aligned relative to each other it is assured that the pallet 5 is in the correct position for the closing of the clamps 7, 8, 9 and 10. These optical markers 16 are adjustable in their positions whereby any parallax that may arise from the positions of the markers 16 and the radiation sensing cameras 15 can be compensated.

The reliability of such an optical alignment system is particularly important in connection with manned space flight because a failure of this system could lead to a life endangering situation for the astronauts. Thus, additional redundant features are provided which, in case of a failure, permit a manual unblocking or locking of the pallet 5 with the support 2.

As shown in FIGS. 3, 5 and 6A, 6B, the locking shaft 1 according to the invention has an intermediate flattened shaft section 1A between its mounting ends 1B that may have a circular cross section held in the mounting blocks MB. Additionally, the shaft 1 has necked down portions 1C and tool access portions 1D preferably at each end whereby the shaft 1 can be slightly rotated when at least one of the screws 1E and counter nut 1F are loosened for releasing a possible jamming between the shaft 1 and the fork 6. By slightly rotating the shaft 1 about the x-axis the play between the shaft section 1A and the fork 6 may be increased from about 0.05 mm to about 15 mm because such rotating aligns the short diameter SD of the shaft section 1A with the y-axis rather than with the z-axis as shown in the locked position of FIG. 5 with the long diameter LD aligned with the y-axis. In the shown locked position the shaft sides with the long diameter LD bear against the inner surfaces of the legs 6L of the fork 6 best seen in FIGS. 7A and 7B. If such rotation of the shaft 1 should not be possible, e.g. due to seizing, the shaft 1 can be removed out of the claw 4A with the fork 6 by removing the nut 17 and the tool 6B from the threaded bolt 6A. This feature of the invention helps to separate the two interlocking devices ID1 and ID2 from each other even in case there was a seize-up between the locking shaft 1 and the fork 6. Thus, the pallet 5 can be removed from the shuttle SS in any event with or without the fork 6.

The large diameter LD of the shaft section 1A determines the locking force or moment in the locked position of FIG. 5. The radius of curvature of the large diameter edges of the shaft section 1 should be selected as large as possible to keep the surface pressure small where the large diameter shaft edges and the inner surfaces of the fork 6 are engaged with each other. The curvature radius may maximally be equal to ½ of the large diameter LD of the central shaft section 1A. This limitation is necessary so that the shaft can be rotated with a small force for the unlocking by bringing the small diameter SD of the shaft section 1A into alignment with the y-axis. The small diameter SD determines the play when the shaft has been rotated about its longitudinal x-axis of the coordinate system. Once the shaft 1 has been rotated sufficiently with the help of a tool applied to the shaft section 1D the nuts 1E and 1F are tightened again on a threaded bolt 6A. The transition between the large and small shaft diameters LD and SD determines the maximum torque moment that the operator, such as an astronaut, needs to apply in order to open or lock the connection between the shaft 1 and the fork 6.

Referring to FIGS. 4 and 5, the diameters of the shaft section 1A cooperate with the bevels 13 and 14 of the fork 6 shown in FIG. 7B and with the bevels B1 and B2 of the claw 4A when the shaft 1 slides into the fork 6 whereby, if necessary, the support 2 is widened or narrowed as described in the direction of the y-axis crosswise of the space shuttle cargo bay CB. The inclination angle of the ramps 13, 14 and of the bevels B1, B2 determines the force that needs to be applied through the clamps 7, 8, 9 and 10 in the space shuttle in order to deform the support 2 even at large temperature differences between the pallet 5 and the support 2. The largest force is required when the shaft section 1A must enter into the fork 6 with the large diameter LD already in the locking position. This fact is taken into account when the shaft 1 and the fork 6 are dimensioned and configured so that the forces required for the insertion of the pallet 5 into the support 2 at the temperature differences to be expected do not exceed the maximally permissibly forces that can be applied through the clamps 7, 8, 9 and 10.

In order to assist the removal of the pallet 5 from the support 2 the above mentioned push out springs 11 and 18 are provided for assisting the robot arm in the space shuttle in overcoming the frictional forces between the shaft 1 and the fork 6 when the pallet 5 is to be taken out of the space shuttle.

Referring to FIGS. 3 and 5 in conjunction, the lock L for holding the shaft 1 in the groove of the fork 6 is shown perspectively in FIG. 3 and in section in FIG. 5.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for releasably securing a load to a fixed structure, said fixed structure defining a three dimensional coordinate system with axes x, y, z, said apparatus comprising a load support (2) mountable to said fixed structure, said load support (2) having two ends (3) between which said load (5) is held, two first interlocking devices (ID1) one of which is secured to each end (3) of said load support (2), two second interlocking devices (ID2) one of which is secured to each of two opposite ends of said load (5) for cooperation with a respective first interlocking device (ID1), each locking device of said two first interlocking devices (ID1) comprising a shaft mounting bracket (3A) connected to a respective end (3) of said load support (2), and a locking shaft (1) having a length axis (x) operatively mounted in said shaft mounting bracket (3A), each locking device of said two second interlocking devices (ID2) comprising a claw mounting bracket (4), a claw (4A) secured to said claw mounting bracket (4), a groove in said claw (4A), a fork (6) operatively mounted in said claw (4A), adjustment means for adjusting the position of said locking shaft (1) and said fork (6) relative to each other for providing play between said shaft (1) and said fork (6) for facilitating inserting said locking shaft (1) into said fork (6) and for a removal of said locking shaft (1) from said fork (6), said adjustment means permitting eliminating said play for releasably interlocking said first and second interlocking devices (ID1, ID2) with each other.

2. The apparatus of claim 1, wherein said adjustment means comprise first adjustment elements (1D, 1E, 1F) cooperating with said locking shaft (1) in said shaft mounting bracket (3A) for increasing said play between said locking shaft (1) and said fork (6), said adjustment means further comprising second adjustment elements (6A, 6B, 17) cooperating with said fork (6) in said claw (4A) for turning said fork (6) within limits of said play.

3. The apparatus of claim 2, wherein said first adjustment elements have a released position in which said locking shaft (1) is movable in the direction of said x- and y-axes, turnable about said x-axis and tiltable relative to said y-axis, wherein said first adjustment elements have a locked position in which said locking shaft (1) is fixed, wherein said second adjustment elements have a released position in which said fork (6) is turnable about said z-axis and wherein said second adjustment elements have a locked position in which said fork (6) is fixed.

4. The apparatus of claim 1, further comprising at least one ejector spring (11) operatively interposed between said support (2) and said claw mounting bracket (4), said at least one ejector spring bearing against said claw mounting bracket (4) with a biasing force tending to move said claw (4A) away from said locking shaft (1) for removing said load from said support (2).

5. The apparatus of claim 4, further comprising a core (12) on which said at least one ejector spring (11) is wound.

6. The apparatus of claim 1, wherein said support (2) is a keel yoke assembly comprising an elastically deformable structure.

7. The apparatus of claim 1, wherein said shaft mounting bracket (3A) secured to said support (2) comprises at least one ramp section (R1, R2) for contacting said claw mounting bracket (4) secured to said load (5), for facilitating an insertion of said load (5) into said support (2).

8. The apparatus of claim 1, wherein said shaft mounting bracket (3A) comprises two interconnected side boards (SB), each side board having an edge (E) facing said claw mounting bracket (4), and wherein each edge (E) facing said claw mounting bracket (4) comprises at least one ramp section for contacting said claw mounting bracket (4).

9. The apparatus of claim 8, wherein each edge (E) facing said claw mounting bracket (4) comprises two ramp sections (R1, R2) with different ramp slopes.

10. The apparatus of claim 9, wherein a first ramp section (R1) has a larger ramp slope than a second ramp section (R2) of said two ramp sections (R1, R2) along said edges (E).

11. The apparatus of claim 1, wherein said fork (6) has two fork legs (6', 6") fitting into said groove of said claw (4A), said fork legs having beveled edges with first bevels (13, 14), said groove of said claw (4) having second bevels (B1, B2) merging into said first bevels (13, 14) thereby forming a guide channel for guiding said locking shaft (11) into said fork (6).

12. The apparatus of claim 1, wherein said locking shaft (1) has a central shaft section (1A) between two mounting portions (1B) wherein said adjustment means comprise tool engageable adjustment elements for turning said locking shaft (1) about its length axis (x), and wherein said central shaft section (1A) has a flattened configuration with a crosssection having a large diameter (LD) and a small diameter (SD).

13. The apparatus of claim 12, wherein said locking shaft (1) is rotatably mounted in said shaft mounting bracket (3A) for aligning said large diameter (LD) with said z-axis to facilitate an insertion of said central shaft section (1A) into said fork (6) and to then align said large diameter (LD) of said central shaft section (1A) with said y-axis for locking said locking shaft (1) in said fork (6).

14. The apparatus of claim 1, wherein said adjustment means comprise a fork mounting screw including a threaded bolt (6A) and a nut (17) holding said fork (6) in said groove of said claw (4A) by said bolt, said nut on said bolt permitting an adjustment of said fork (6) by loosening said nut (17) and turning said bolt (6A) and fork (6) in said groove within a limit of said play, and to facilitate removal of said locking shaft (1) from said fork (6) when said nut (17) is removed from said bolt (6A), said nut (17) permitting locking said bolt (6A) in an adjusted position when the nut (17) is tightened.

15. The apparatus of claim 14, wherein said adjustment screw with its bolt (6A) normally extends in the direction of said z-axis.

16. The apparatus of claim 1, further comprising optical elements (15, 16) positioned for providing alignment signals indicating a correct position of said load (5) in said support (2).

17. The apparatus of claim 16, wherein said optical elements (15) are mounted to said load (5), and said optical elements (16) are mounted to said support (2).

18. The apparatus of claim 17, wherein said optical elements are adjustably mounted.

19. The apparatus of claim 1, wherein said shaft mounting bracket (3A) comprises two interconnected side boards (SB) spaced from each other, two mounting blocks (MB) secured between said two side boards for mounting said locking shaft (1) to said shaft mounting bracket so that a central section (1A) of said locking shaft (1) extends between said two mounting blocks (MB), and a lock (L, L1) including a cam (C) positioned in said shaft mounting bracket (3A), said cam (C) moving in response to an operation of said lock (L, L1).

20. The apparatus of claim 19, wherein said shaft mounting bracket (3A) comprises an opening between said interconnected side boards (SB), and wherein said lock (L, L1) is operatively mounted in said opening for latching said cam (C) against said central section (1A) of said locking shaft (1), when said central section (1A) is in a locking position.

* * * * *